(12) United States Patent
Cenko

(10) Patent No.: US 10,155,279 B2
(45) Date of Patent: Dec. 18, 2018

(54) WIRE LOCK FOR ROTARY WELDING TORCH

(71) Applicant: Arben Cenko, Windsor (CA)

(72) Inventor: Arben Cenko, Windsor (CA)

( * ) Notice: Subject to any disclaimer, the term of this patent is extended or adjusted under 35 U.S.C. 154(b) by 321 days.

(21) Appl. No.: 15/054,241

(22) Filed: Feb. 26, 2016

(65) Prior Publication Data

US 2016/0279729 A1   Sep. 29, 2016

Related U.S. Application Data

(60) Provisional application No. 62/138,569, filed on Mar. 26, 2015.

(51) Int. Cl.
```
B23K 9/133    (2006.01)
B23K 9/12     (2006.01)
B23K 9/29     (2006.01)
```
(52) U.S. Cl.
CPC .............. *B23K 9/133* (2013.01); *B23K 9/124* (2013.01); *B23K 9/295* (2013.01)

(58) Field of Classification Search
CPC ......... B23K 9/133; B23K 9/124; B23K 9/295
USPC .............. 219/137.7, 137.71, 137.72, 124.34, 219/137.61, 125.1
See application file for complete search history.

(56) References Cited

U.S. PATENT DOCUMENTS

| | | | | |
|---|---|---|---|---|
| 2,366,696 A | * | 1/1945 | Boldt ..................... | B62D 11/08 188/16 |
| 5,399,837 A | * | 3/1995 | Mangelsen .............. | B23K 9/32 219/125.1 |
| 2011/0198332 A1 | | 8/2011 | Cenko | |

* cited by examiner

*Primary Examiner* — Phuong Nguyen
(74) *Attorney, Agent, or Firm* — Warner Norcross + Judd LLP

(57) ABSTRACT

A wire lock for use with a rotary welding torch includes a piston and a lock receiver. The piston includes a head, a stem, and an air channel. The piston head defines an internal cavity in communication with the air channel. The generally cylindrical lock receiver includes a flat face, a central conduit, and a slot in communication with the central conduit. The piston and lock receiver are positioned such that the piston stem is received within the slot, respectively. The piston is reciprocally movable between an unlocked and a locked position, and the piston stem and lock receiver are configured to clamp an electrode wire therebetween when the piston is in the locked position. The wire lock may be co-axial or perpendicular to the axis of the rotary welding torch, and may be integral to the welding torch or a swan neck of the welding torch.

13 Claims, 13 Drawing Sheets

(A)

(B)

WIRE LOCK FOR ROTARY WELDING TORCH

BACKGROUND OF THE INVENTION

The present invention generally relates to a wire lock for use with a welding torch, and more particularly to a wire lock integrated into a rotary welding torch.

A rotary welding torch, such as a torch that may be used with the present invention, typically has a central longitudinal bore through which an elongated electrode wire extends, protruding a short distance from the lower end of the torch. The wire is fed through a wire feed system that feeds the wire through the torch as the wire is being consumed during the welding process. The distance which the electrode wire extends from the end of the torch is referred to as the "stick out" distance and should stay constant throughout out the welding operation to ensure accurate welding.

Rotary welding torches generally provide unrestricted bidirectional rotation and are mounted to a robotic arm that moves and rotates about during the welding process. Frequently, during movement of the robotic arm and torch, the wire contracts or extends, causing the stick out distance to be altered and decreasing the accuracy of the weld operation.

Wire brakes have been used in the past to secure the wire rigidly to the torch during movement of the robotic arm. However, these wire brakes do not have the capability to rotate unrestrictedly in both directions. Further, many wire brakes are mounted to the outside of the torch housing, and are so large that they interfere with the welding process in many situations

SUMMARY OF THE INVENTION

In contrast, the wire lock disclosed herein offers an integrated wire lock for use with a rotary welding torch. The present wire lock is built into the welding torch and does not interfere with the surrounding tooling during the welding process. The wire lock utilizes pressurized air supplied through internal passageways within the welding torch such that endless rotation between the welding torch and the robotic arm is possible. Further, the wire lock maintains the wire stick out distance by gripping the wire during movement of the robotic arm and welding torch.

As disclosed, a wire lock includes a piston and a cylindrical lock receiver. The piston includes a head, a stem, and an air channel. The piston head defines an internal cavity in fluid communication with the air channel. The generally cylindrical lock receiver includes a flat face, a central conduit, and a slot in fluid communication with the central conduit. The piston and lock receiver are positioned such that the piston stem is received within the slot, respectively. The piston is reciprocally movable between an unlocked position and a locked position, and the piston stem and lock receiver are configured to clamp an electrode wire therebetween when the piston is in the locked position.

According to another embodiment, a welding torch assembly and integrated wire lock includes a welding torch, an electrode wire, a piston, and a lock receiver. The welding torch defines a longitudinal axis and includes a central bore extending along the longitudinal axis and an air chamber oriented perpendicular to the longitudinal axis. The electrode wire extends through the welding torch central bore. The piston includes a head and a stem; the head defines an internal cavity and includes an air channel in fluid communication with the internal cavity. The generally cylindrical lock receiver includes a flat face, a central conduit, and an elongated slot in communication with the central conduit. A plurality of air holes extend longitudinally through the lock receiver and the electrode wire passes through the central conduit. The lock receiver is positioned within the central bore and the piston is mounted within the air chamber, and the two components are aligned such that the piston stem is received within the elongated slot. The piston is reciprocally movable between an unlocked position and a locked position, and the stem and lock receiver are configured to clamp the electrode wire therebetween when the piston is in the locked position.

According to another embodiment, a wire lock includes a piston guide, a piston, and a lock receiver. The piston guide has a cap and a post. The piston includes a head having a central opening and a stem. The piston guide post extends into the central opening of the piston. The generally cylindrical lock receiver includes a flat face, a central conduit, and a slot in fluid communication with the central conduit. The piston and lock receiver are positioned such that the piston stem is received within the slot. The piston is reciprocally movable along the piston guide post between an unlocked position and a locked position, and the piston stem and lock receiver are configured to clamp an electrode wire therebetween when the piston is in the locked position.

According to yet another embodiment, a co-axial wire lock includes a piston guide, a piston, and an air chamber cup having a conical interior wall. The hollow piston guide defines a central conduit therethrough, and includes a cap and a post. The piston includes a head and articulating locking jaws. The piston head has a central opening, and the piston guide post extends into the central opening. The piston is reciprocally movable along the piston guide post between an unlocked position and a locked position. When the piston moves to the locked position, the locking jaws press against the conical interior wall of the air chamber cup, articulating the locking jaws closed to clamp an electrode wire within the locking jaws.

The wire lock may be built either co-axially or perpendicular to the axis of the rotary welding torch.

These and other features and advantages of the invention will be more fully understood and appreciated by reference to the entire application including the specification, the claims, and the drawings.

DESCRIPTION OF THE CURRENT EMBODIMENT

Figure 1:
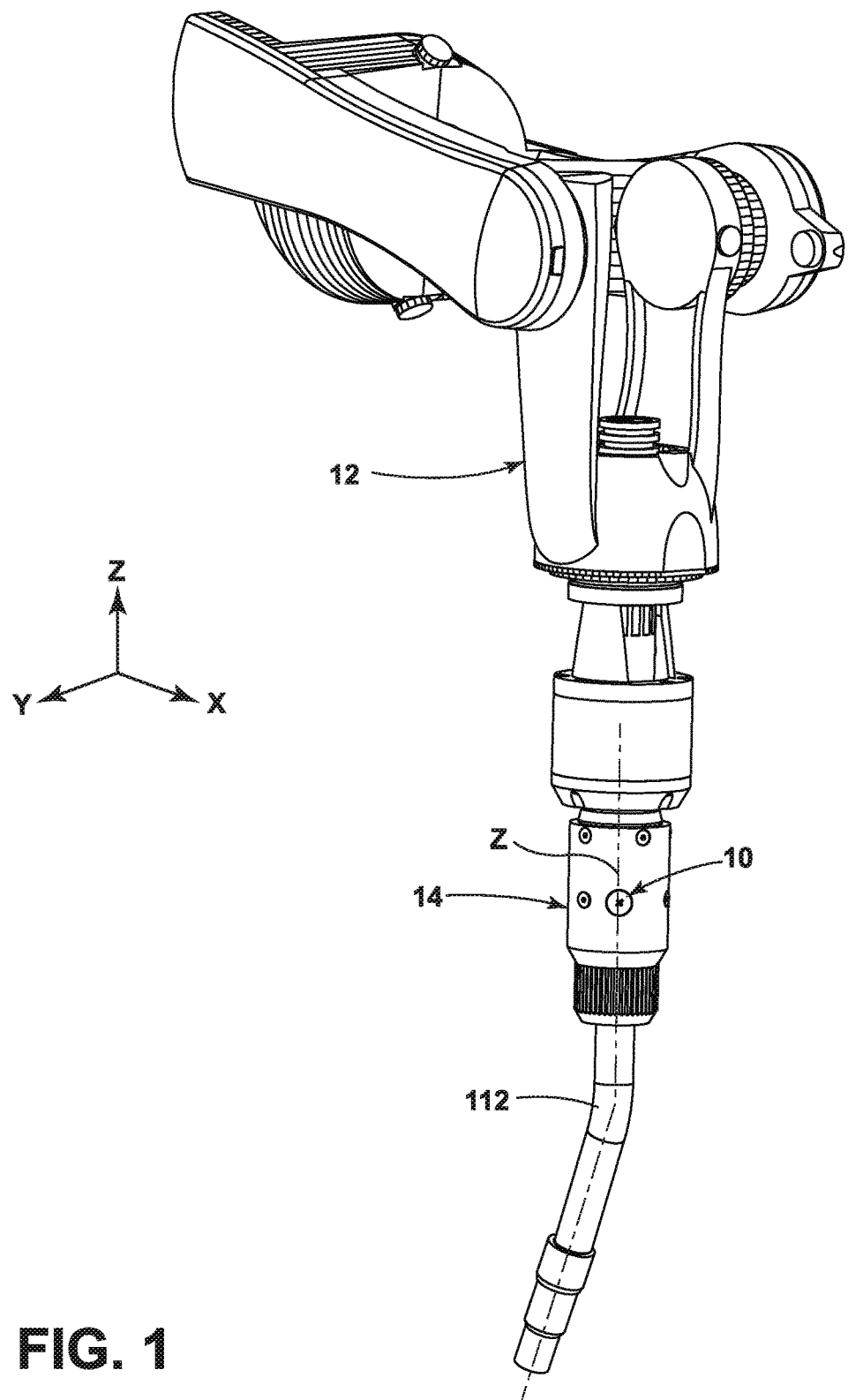
FIG. 1 is a perspective view of a robotic arm and a welding torch including an integrated wire lock.

A wire lock 10 according to an embodiment of the invention is illustrated in FIGS. 1-11. The wire lock 10 may be used with robotic applications and is shown mounted to a robotic arm 12 and a rotary welding torch 14. The wire lock may be built either co-axially or perpendicular to the axis of the rotary welding torch.

Throughout this description, directional terms, such as "upper", "lower", "inner", "outer", "front", and "rear", are used based on the orientation of the embodiment shown in the drawings. The welding torch 14 defines a longitudinal axis Z, as labeled in FIG. 1. The use of directional terms does not limit the embodiment or the invention to any specific orientation(s).

I. Structure

Referring to FIGS. 2-11 and according to a first embodiment, the wire lock 10 includes a piston 20 and a cylindrical lock receiver 40. The piston 20 includes a piston head 22 and a stem 24. The piston head 22 defines an internal cavity 26 and an air channel 28 through a sidewall of the piston head 22. The air channel 28 enables fluid communication with the internal cavity 26 from outside the piston head 22. Further, the piston 20 includes a lower flange 30 around a lower portion of the piston head 22, the purpose of which will be described in full detail below. The piston stem 24 extends down from the piston head 22 and has opposed flat sides 32 and terminates in a V-shaped groove 34. Additionally, an exterior surface of the piston head 22 includes at least one annular groove 36 in which an annular seal 38 may be seated. In the illustrated example, the piston head 22 includes two spaced grooves 36 and seals 38.

The lock receiver 40 is generally cylindrical but has a flat face 42 on the otherwise circular outer surface. The lock receiver 40 includes an axially extending central conduit 44 and a plurality of air holes 46. The lock receiver 40 also includes an elongated slot 48 formed in the flat face 42 which is in fluid communication with the central conduit 44. A mounting hole 50 is positioned on a lower surface of the lock receiver 40, opposite the flat face 42.

The wire lock 10 includes a compression spring 56 that encircles the piston stem 24. The compression spring 56 is held in place under the piston head 22 by the lower flange 30.

Figure 5:
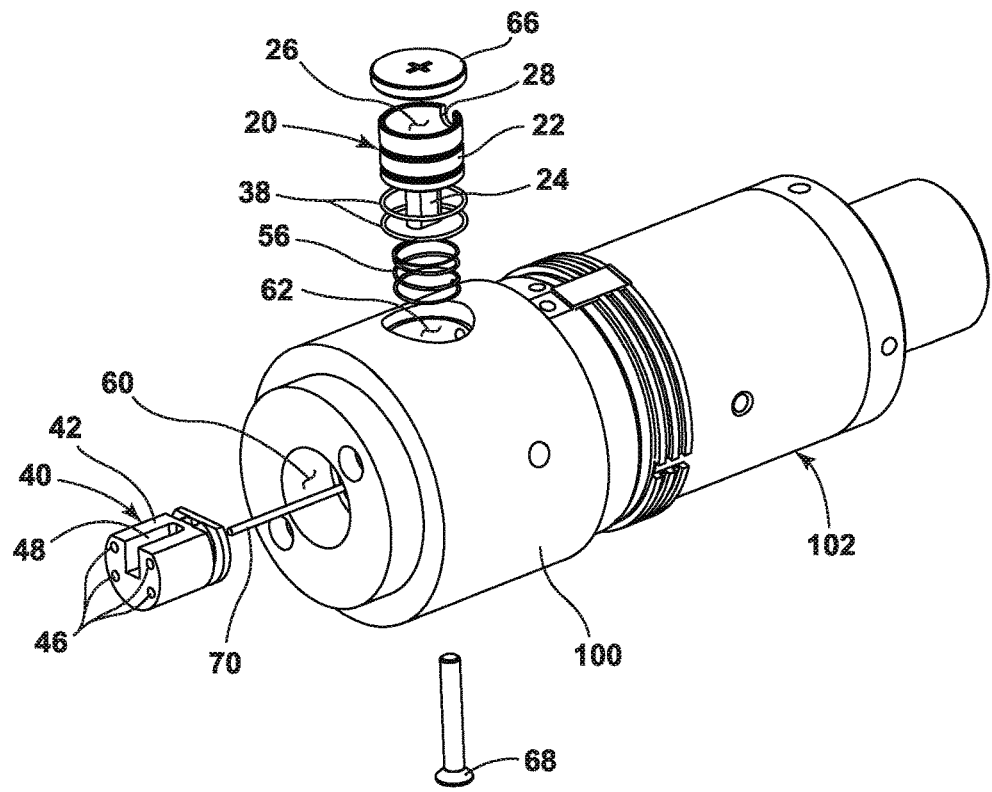
FIG. 5 is an exploded view of the wire lock of FIG. 3 and a portion of a welding torch.
Figure 6:
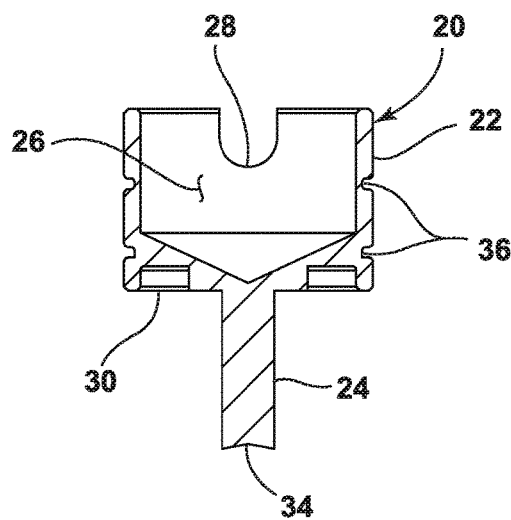
FIG. 6 is a cross-sectional view of a piston of the wire lock of FIG. 3.
Figure 7:
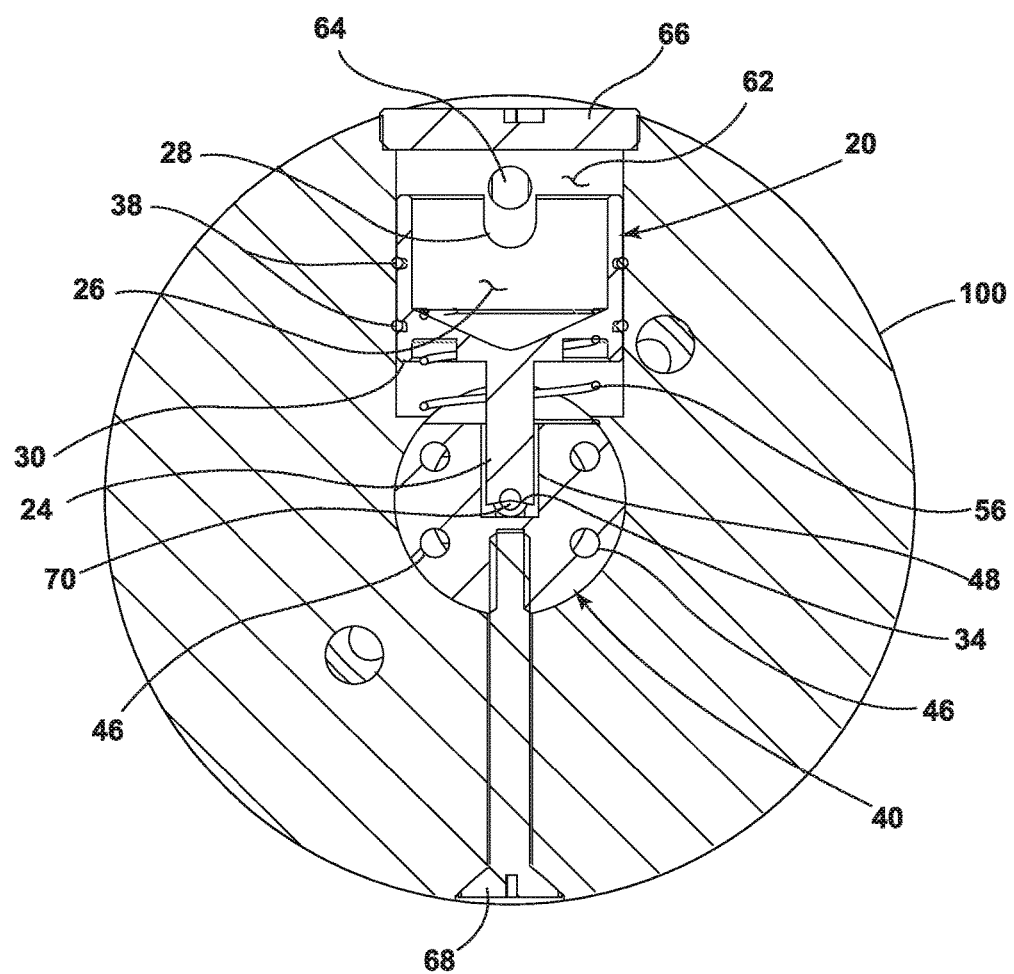
FIG. 7 is a cross-sectional view of the wire lock of FIG. 3 and welding torch taken along line XII-XII of FIG. 2.
Figure 8:
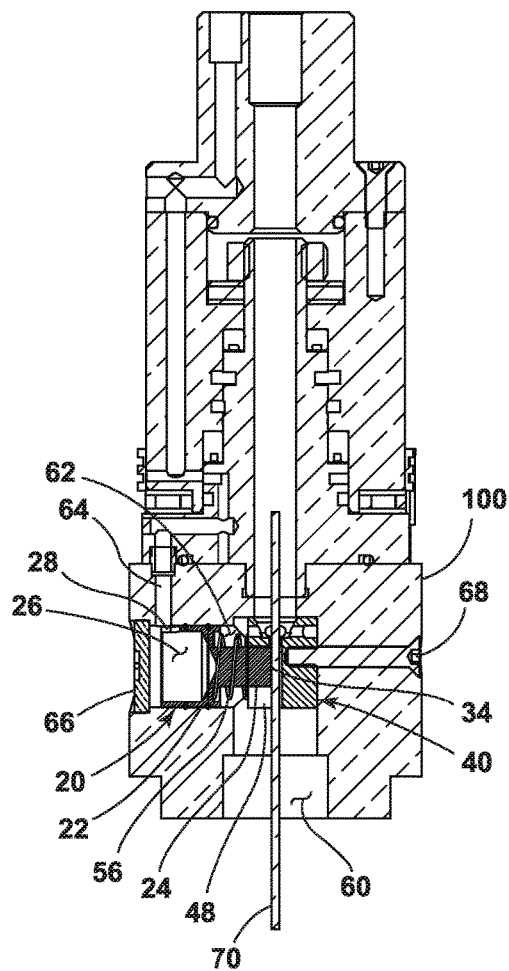
FIG. 8 is a cross-sectional view of the wire lock of FIG. 3 and welding torch taken along line XIII-XIII of FIG. 2, illustrating a locked position B.
Figure 9:
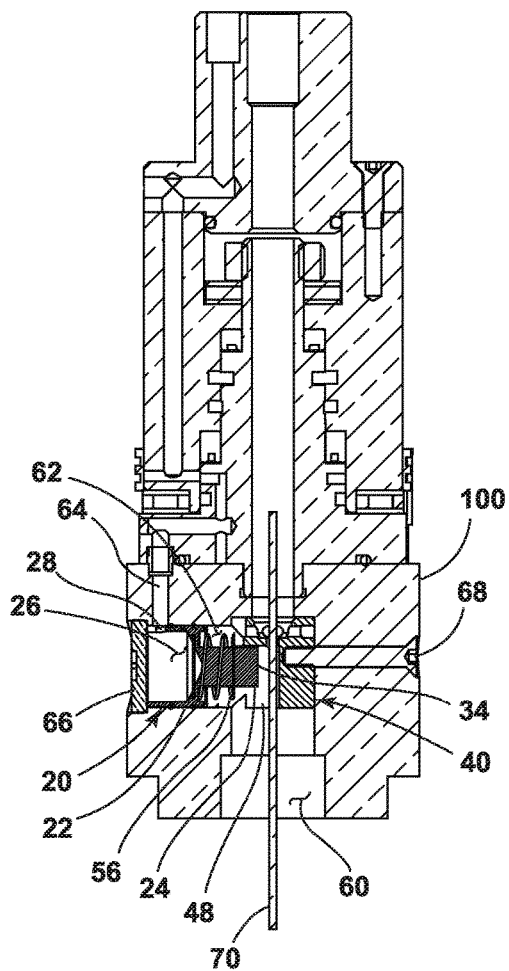
FIG. 9 is a is a cross-sectional view of the wire lock of FIG. 3 and welding torch taken along line IX-IX of FIG. 3, illustrating an unlocked position A.
Figure 10:
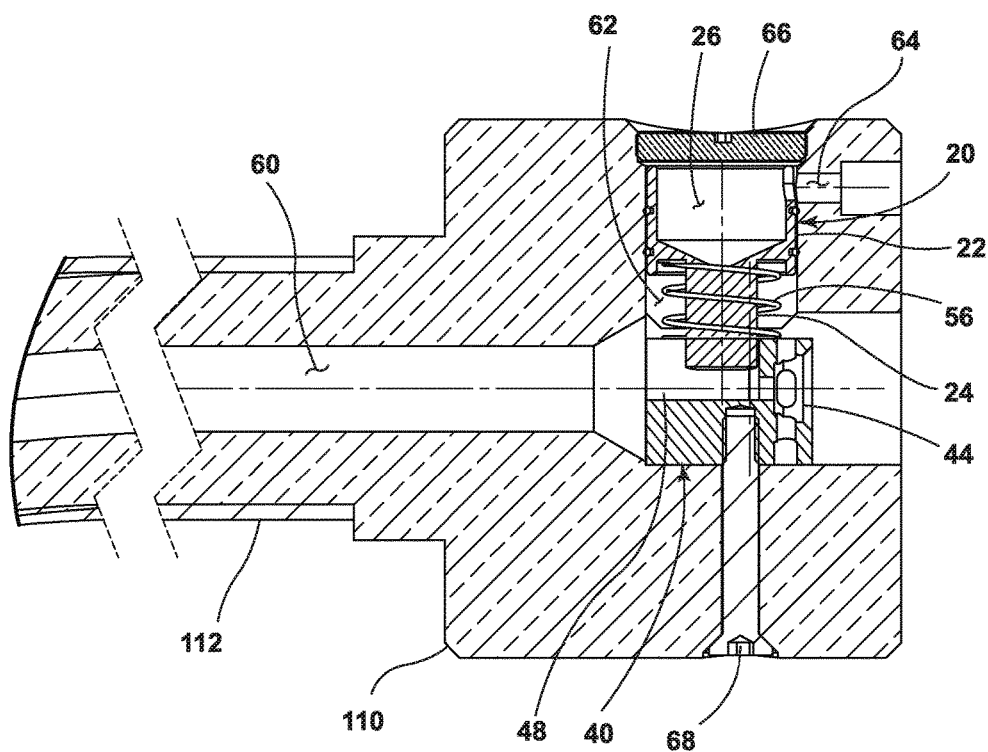
FIG. 10 is a cross-sectional view of the wire lock of FIG. 3 and swan neck taken along line X-X of FIG. 3.

Referring to FIG. 5, the wire lock 10 is installed within the rotary welding torch 14. The welding torch 14 includes a central bore 60 that extends along the longitudinal axis Z of the torch and an air chamber 62 that is oriented perpendicular to the longitudinal axis Z. The central bore 60 and air chamber 62 intersect and are therefore in fluid communication. The welding torch 14 also includes a network of air passageways 64 (see FIGS. 8 and 9) formed and/or housed within the torch; the air passageways 64 are in fluid communication with at least the air chamber 62.

The piston 20 is positioned within the air chamber 62. Moreover, the piston 20 is reciprocally movable within the air chamber 62 between an unlocked position A and a locked position B, shown respectively in FIGS. 8 and 9. The seals 38 encircling the piston head 22 provide sealing engagement with the interior of the air chamber 62. An air chamber cap 66 encloses the open exterior end of the air chamber 62 and may be threaded in an air-tight manner to the air chamber 62. The lock receiver 40 is positioned within the central bore 60 and a fastener 68 is inserted into the mounting hole 50 to secure the lock receiver 40 within the central bore 60. An electrode wire 70 is fed through the welding torch 14 within the central bore 60 and passes through the central conduit 44 and elongated slot 48 of the lock receiver 40.

The distal end of the piston stem 24 is received within the elongated slot 40. The opposed flat sides 32 of the stem 24 and the elongated slot 40 are configured to register or align the piston 20 relative to the lock receiver 40, and more specifically to align the air channel 28 of the piston head 22 with the air passageway 64 of the welding torch 14. The compression spring 56 is positioned between the piston head 22 and the flat face 42 of the lock receiver 40, urging the piston 20 up (or to the left as viewed in FIG. 9).

An air fitting (not shown) may be connected to the welding torch 14 and fluidly communicating with the air passageway 64 for introducing pressurized air to the air passageway 64. Pressurized air passes through the air passageway 64 and the aligned air channel 28 which leads to the internal cavity 26 of the piston 20. The pressurized air is introduced above the piston head 22, building pressure within the internal cavity 26 and causing the piston 20 to move from the unlocked position A to the locked position B. More specifically, the piston 20 moves down within the air chamber 62 until the distal end of the stem 24, the V-shaped groove 34, engages the electrode wire 70 passing through the slot 48. The V-shaped groove 34 is shaped to clamp the electrode wire 70 between the distal end of the stem 24 and the lock receiver 40 when the piston 20 is in the locked position B. The clamping force with which the V-shaped groove 34 presses against the electrode wire 70 is sufficient to hold the wire 70 in place while the robotic arm 12 is moved about. After the robotic arm 12 movement is complete, the air pressure is removed and the piston 20 is free to move to its unlocked position A, shown in FIG. 9.

Figure 2:
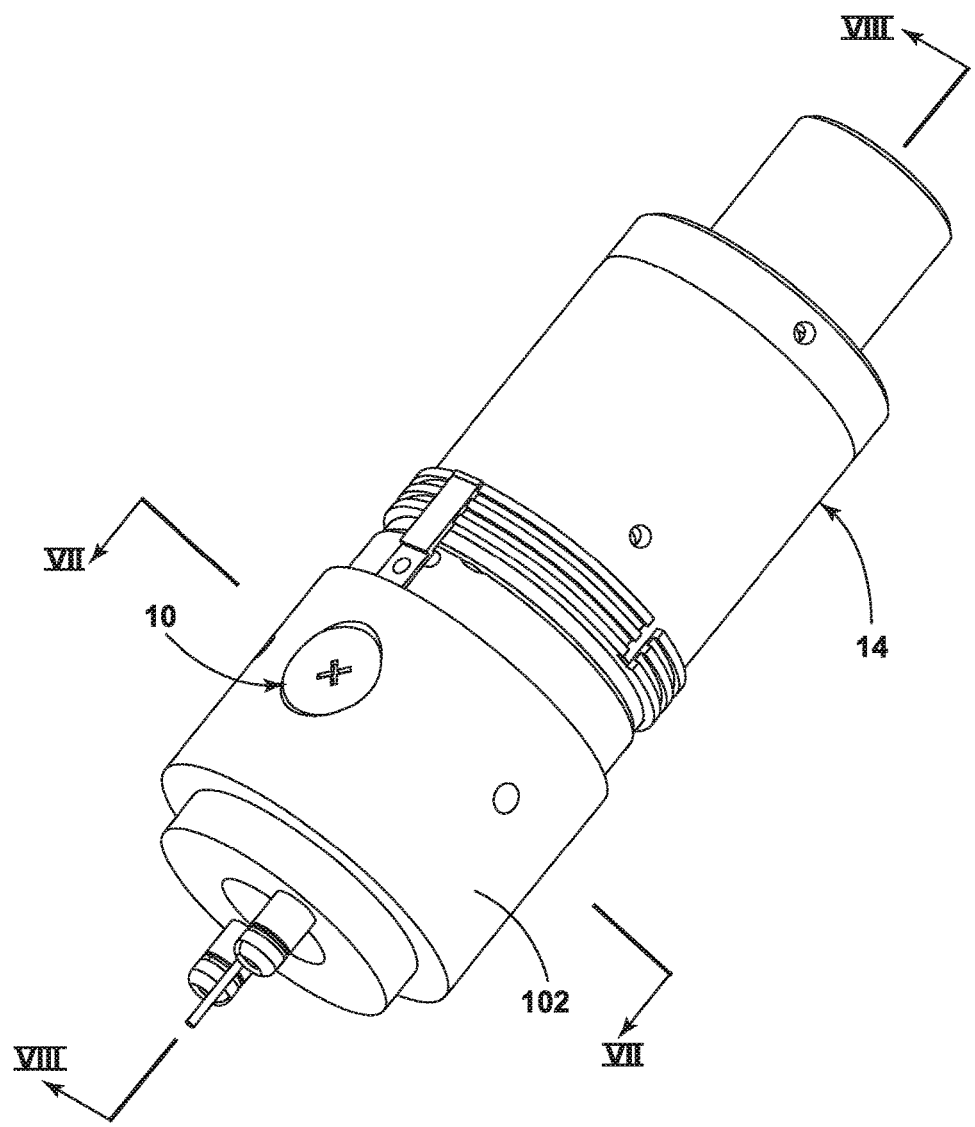
FIG. 2 is a perspective view of a wire lock integrated into the welding torch.
Figure 3:
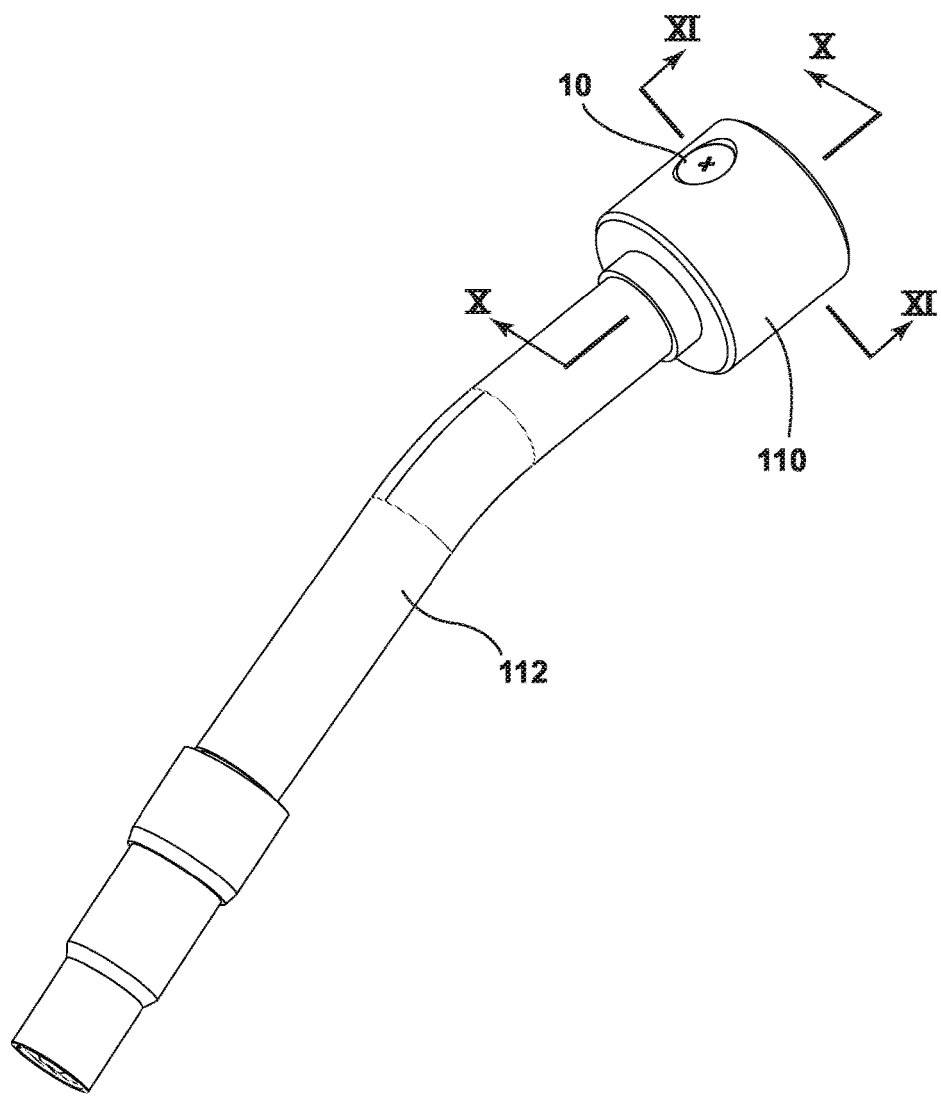
FIG. 3 is a perspective view of a wire lock integrated into a swan neck of the welding torch.
Figure 4:
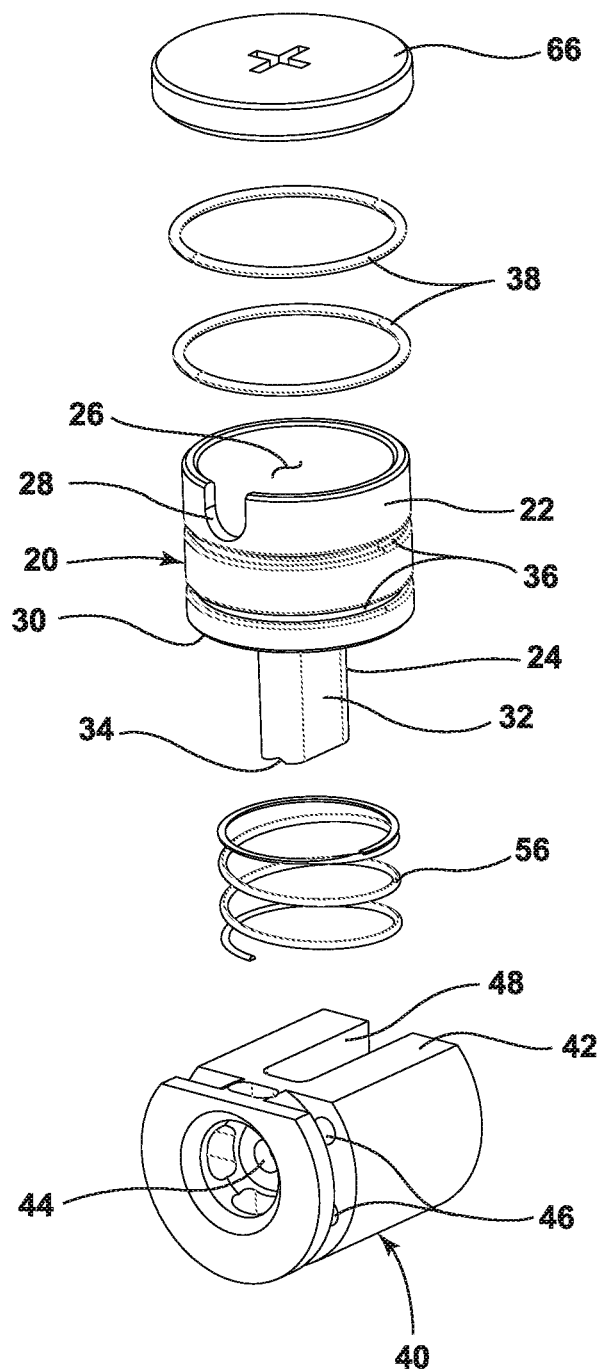
FIG. 4 is an exploded view of a wire lock according to a first embodiment of the present invention.
Figure 11:
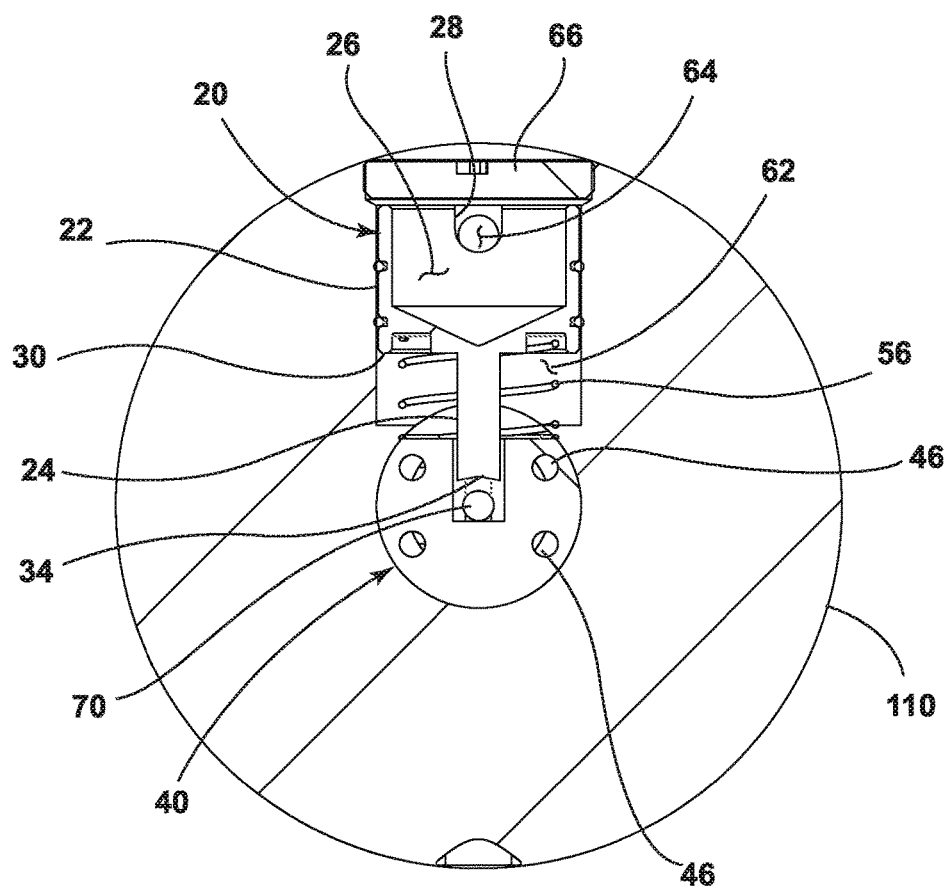
FIG. 11 is a cross-sectional view of the wire lock of FIG. 3 and swan neck taken along line XI-XI of FIG. 3.

The central bore 60 and air chamber 62 may be located in a body 100 of a lower torch 102, as illustrated in at least FIGS. 2 and 5. Alternately, the central bore 60 and air chamber 62 may be located in a collar 110 of a torch swan neck 112, as illustrated in FIGS. 3, 19, and 11.

The air holes 46 extending longitudinally through the lock receiver 40 are configured to allow gas to flow through the central bore 60 of the welding torch 14 for supplying gas to the welding operation, in the conventional manner.

Figure 12:
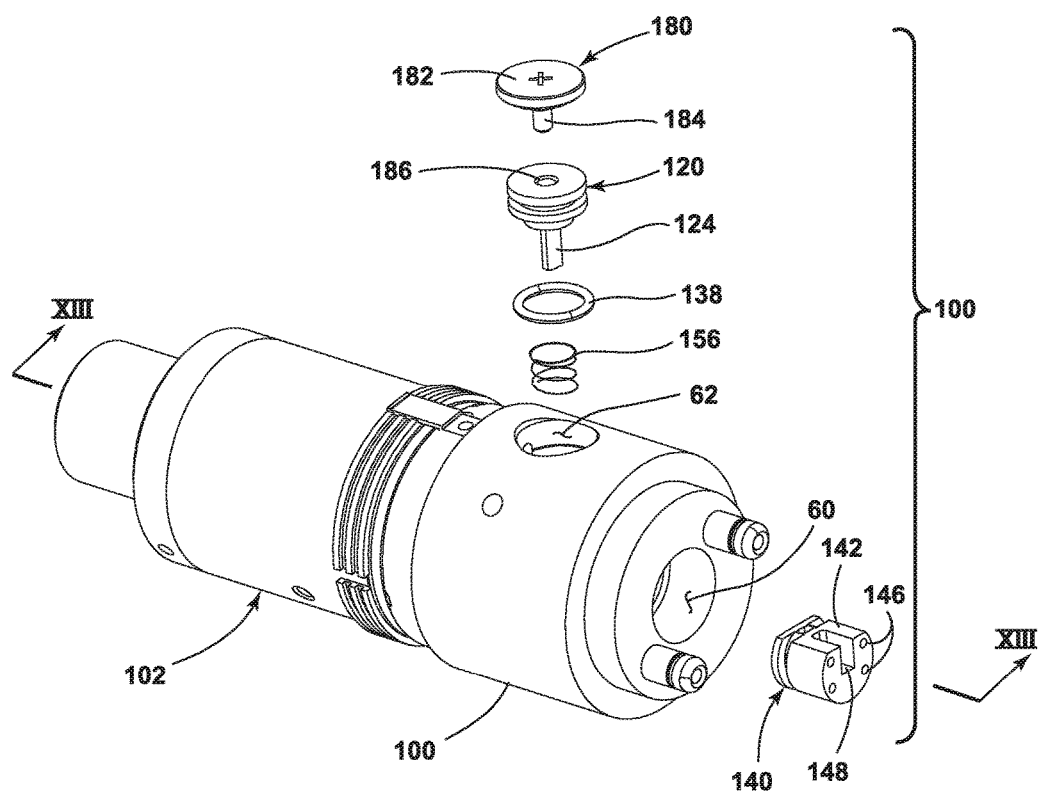
FIG. 12 is an exploded view of a portion of a welding torch and a wire lock according to a second embodiment of the present invention.
Figure 13:
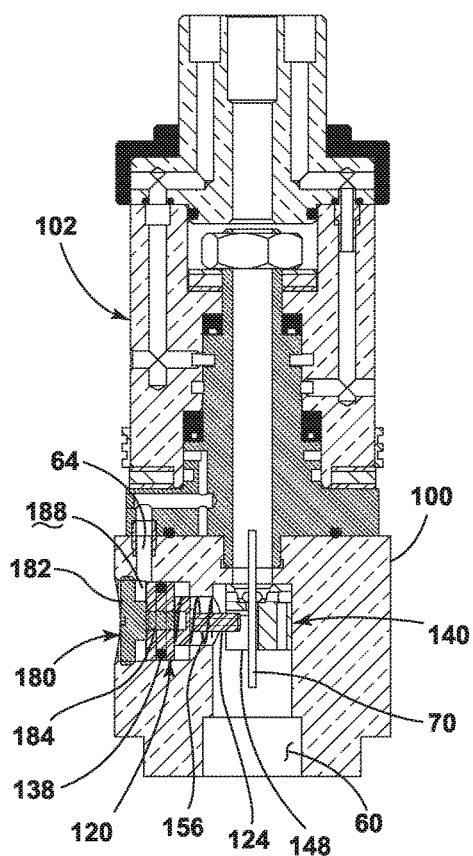
FIG. 13 is a cross-sectional view of the wire lock of FIG. 12 and the welding torch taken along line XIII-XIII of FIG. 12, illustrating an unlocked position A.
Figure 14:
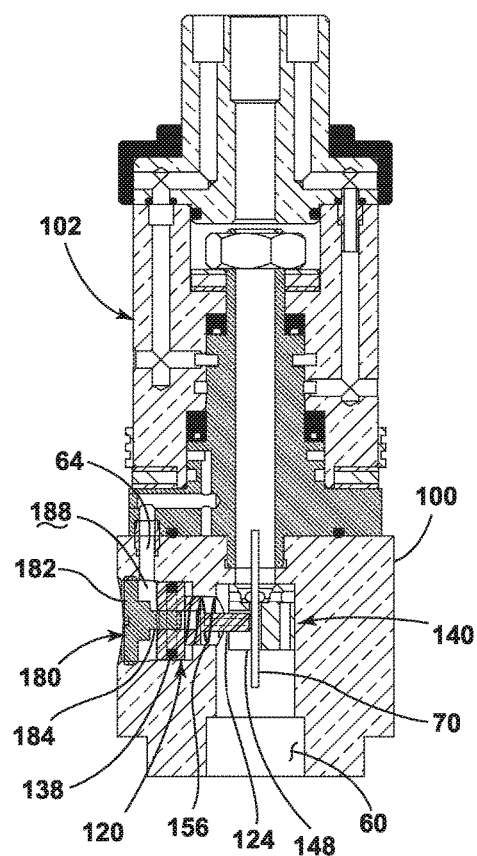
FIG. 14 is a cross-sectional view of the wire lock of FIG. 12 and the welding torch taken along line XIII-XIII of FIG. 12, illustrating a locked position B.

Referring to FIGS. 12-14, a second embodiment of a wire lock 100 is illustrated. The wire lock 100 of the second embodiment is structurally and functionally similar to the wire lock 10 of the first embodiment; accordingly, like parts will be identified with like numerals, increased by 100.

The wire lock 100 includes the piston 120 and a piston guide 180. The piston guide 180 includes a cap 182 and a post 184 extending down from the cap 182. The piston head 122 has a central opening 186 and the piston guide post 184 extends into the central opening 186. The piston guide cap 182 encloses the open exterior end of the air chamber 62 and may be threaded in an air-tight manner to the body 100 of the torch 14.

The piston 120 is positioned within the air chamber 62 and a seal 138 is positioned within the groove 136 and encircles the piston head 122, providing sealing engagement with the interior of the air chamber 62. The piston 120 is reciprocally movable along the piston guide post 184 between an unlocked position A and a locked position B, shown respectively in FIGS. 13 and 14. The compression spring 156 is positioned between the piston head 122 and the flat face 142 of the lock receiver 140, urging the piston 120 up (or to the left as viewed in FIGS. 13 and 14).

The piston guide cap 182 is spaced from the piston head 122, defining an annular void 188 within the welding torch air chamber 62. The void 188 is in fluid communication with the air passageway 64 of the welding torch 14. Pressurized air passes through the air passageway 64 and is introduced above the piston head 122, building pressure within the annular void 188 and causing the piston 120 to move from the unlocked position A to the locked position B. More specifically, the piston 120 moves down the piston guide post 184 (within the air chamber 62) until the distal end of the stem 124, the V-shaped groove 134, clamps the electrode wire 70 between the distal end of the stem 124 and the lock receiver 140. The clamping force with which the V-shaped groove 134 presses against the electrode wire 70 is sufficient to hold the wire 70 in place while the robotic arm 12 is moved about. After the robotic arm 12 movement is complete, the air pressure is removed and the piston 120 is free to move to its unlocked position A, shown in FIG. 13.

Figure 15:
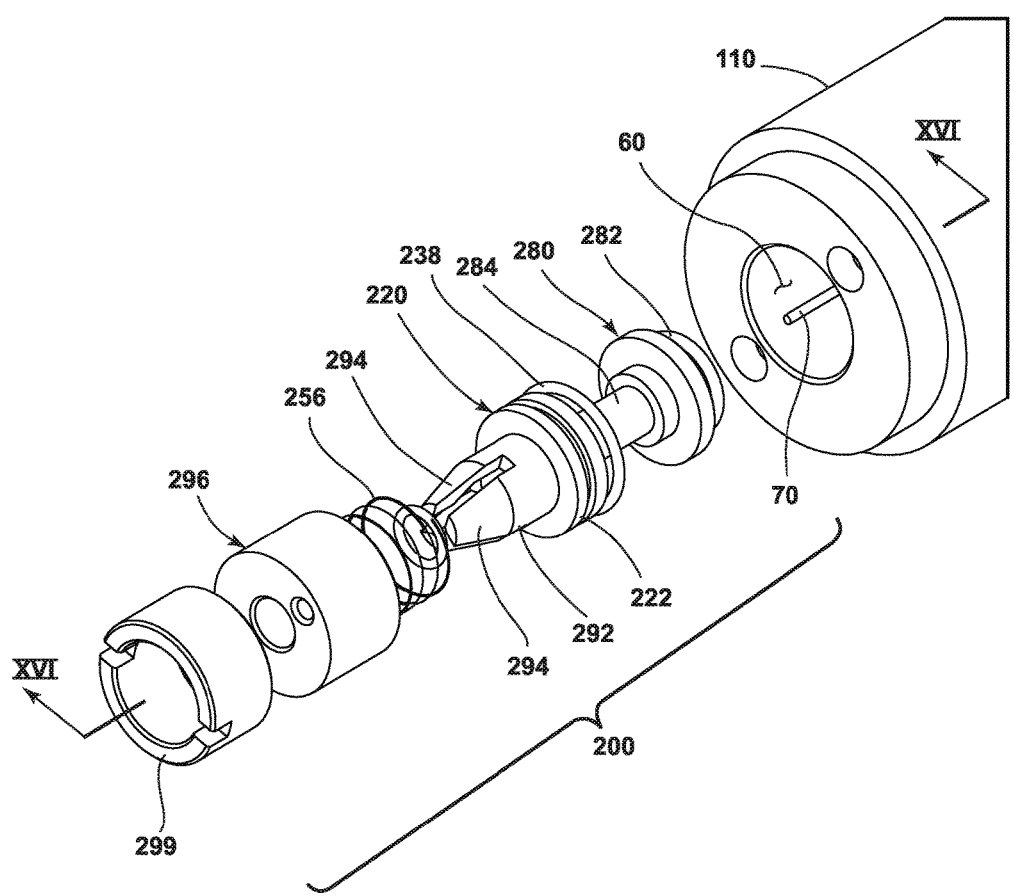
FIG. 15 is an exploded view of a portion of a welding torch and a wire lock according to a third embodiment of the present invention.
Figures 16, 17:
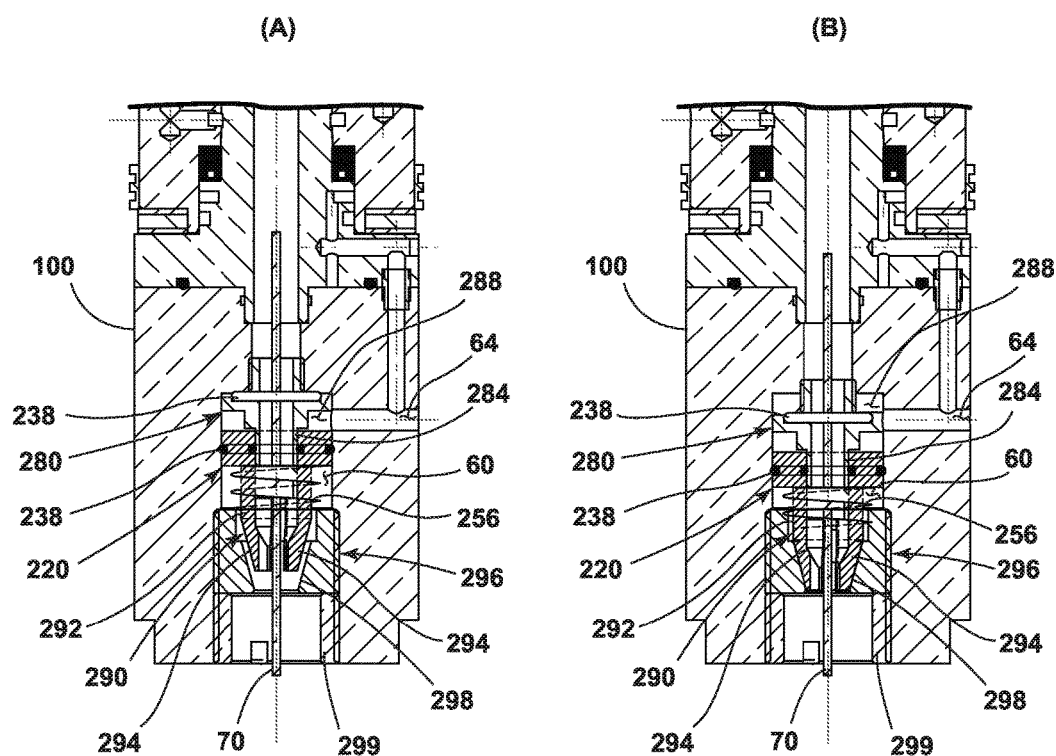
FIG. 16 is a cross-sectional view of the wire lock of FIG. 14 and the welding torch taken along line XVI-XVI of FIG. 15, illustrating an unlocked position A.
FIG. 17 is a cross-sectional view of the wire lock of FIG. 14 and the welding torch taken along line XVI-XVI of FIG. 15, illustrating a locked position B.

Referring to FIGS. 15-17, a third embodiment of a wire lock is illustrated. The third embodiment is a co-axial wire lock 200 that includes a piston 220 and a piston guide 280. The piston guide 280 includes a cap 282 and a post 284; the piston guide 280 is hollow and defines a central conduit 290 therethrough. The piston guide 280 may be threaded for threadably affixing the piston guide 208 within the interior of the central bore 60. Further, a seal 238 may be positioned around the piston guide cap 282 to provide sealing engagement with the interior of the central bore 60.

The piston 220 includes a head 222 with a central opening 286 and an articulating locking jaw 292. The locking jaw 292 is substantially conical shape and includes cooperative jaw prongs 194 that are flexible or jointed to be able to flex toward one another. The locking jaw is shown split into three equal and spaced jaw prongs 294; however, the jaw could be split into two or more prongs 294. The piston guide post 280 extends into the central opening 286 of the piston 220, and the piston 220 is reciprocally movable along the piston guide post 280 between an unlocked position A and a locked position B, illustrated in FIGS. 16 and 17.

The co-axial wire lock 200 also includes an air chamber cup 296 with a conical interior wall 298. The air chamber cup 296 is positioned within the central bore 60 of the welding torch 14, and an end ring 299 is positioned adjacent the air chamber cup 296 to secure the co-axial wire lock 200 within the central bore 60. Both the air chamber cup 296 and the end ring 299 may be threadably joined to the interior of the central bore 60.

The components of the co-axial wire lock 200 are co-axially arranged within the central bore 60. A seal 238 is positioned within a groove 236 that encircles the piston head 222, providing sealing engagement with the interior of the central bore 60. Another seal 238 may be positioned inside the piston head 222 to provide sealing engagement between the piston guide post 284 and the central opening 286 of the piston 220. Additionally, the compression spring 256 is positioned between the piston head 222 and the air chamber cup 296, urging the piston 220 up as viewed in FIGS. 16 and 17.

The piston guide cap 282 is spaced from the piston head 222, defining an annual void 288 within the central bore 60. The void 288 is in fluid communication with the air passageway 64 of the welding torch 14. Pressurized air passes through the air passageway 64 and is introduced above the piston head 222, building pressure within the annular void 288 and causing the piston 220 to move from the unlocked position A to the locked position B. More specifically, the piston 220 moves down the piston guide post 284 (within the central bore 60) until the locking jaw 292 is pressed against the air chamber cup 296. The conical interior wall 298 urges the prongs 294 of the locking jaw 292 to articulate inward, clamping the electrode wire 70 that extends through the central bore 60 within the locking jaw 292. The clamping force with which the locking jaw 292 grasps the electrode wire 70 is sufficient to hold the wire 70 in place while the robotic arm 12 is moved about. After the robotic arm 12 movement is complete, the air pressure is removed and the piston 220 is free to move to its unlocked position A, shown in FIGS. 16 and 17.

II. Operation

The wire lock 10, 100, 200 may be used in a robotic welding and manufacturing application. The wire lock 10, 100, 200 is configured to lock or retain the electrode wire 70 within the welding torch 14 during movement of the robotic arm 12, preserving the electrode wire stick out distance.

As described above, the wire lock 10, 100, 200 is activated by pressurized air that passes through the welding torch 14 itself. It is contemplated that the same controller that controls operation of the robotic arm 12 may also control operation of the pressurized air. After the robotic arm 12 movement is complete, the air pressure is removed and the piston 20, 120, 220 is free to move to its unlocked position A, shown in FIGS. 9, 13, and 16.

During the welding operation, inert gas and electrode wire are supplied through the central bore 60 to the tip of the welding torch. The wire lock 10, 100 of the first and second embodiments utilize the lock receiver 40, 140 mounted within the central bore 60. Although an object is positioned within the central bore 60, normal welding functionality is preserved because the lock receiver 40, 140 includes the central conduit 44 and air holes 46 so that the respective electrode wire 70 and inert gas are able to pass therethrough. Regarding the co-axial wire lock 200 of the third embodiment, the co-axial wire lock 200 is positioned within the central bore 60; however, normal welding functionality is preserved because the center of the co-axial wire lock 200 (specifically the piston guide 280, piston 220, air chamber cup 296, and end ring 299) forms a conduit through which the electrode wire 70 and inert gas are able to pass.

The wire lock described herein provides an integrated wire lock for use with a rotary welding torch. The present wire lock is built into the welding torch, does not interfere with the surrounding tooling during the welding process, and may be built either co-axially or perpendicular to the axis of the rotary welding torch. The wire lock utilizes pressurized air supplied through internal passageways within the welding torch such that endless rotation between the welding torch and the robotic arm is possible. Further, the wire lock maintains the wire stick out distance by gripping the wire during movement of the robotic arm and welding torch. The present disclosure offers improved performance in the robotic welding process, without sacrificing durability or compactness.

Any reference to elements in the singular, for example, using the articles "a," "an," "the," or "said," is not to be construed as limiting the element to the singular.

The above description is that of a current embodiment of the invention. Various alterations and changes can be made without departing from the spirit and broader aspects of the invention as defined in the appended claims, which are to be interpreted in accordance with the principles of patent law including the doctrine of equivalents.

The invention claimed is:

1. A welding torch assembly comprising:
a welding torch defining a longitudinal axis and including a central bore extending along the longitudinal axis;
an electrode wire extending through the central bore; and
a wire lock comprising:
a piston including a head, a piston stem, and an air channel, the head defining an internal cavity in fluid communication with the air channel; and
a cylindrical lock receiver including a central conduit and a slot in fluid communication with the central conduit, the cylindrical lock receiver having a flat face;
the piston and the lock receiver being positioned such that the piston stem is received within the slot, the piston being reciprocally movable between an unlocked position and a locked position, the piston stem and the lock receiver being configured to clamp the electrode wire therebetween when the piston is in the locked position, the lock receiver being configured to be positioned in the central bore along the longitudinal axis of the welding torch, the piston being configured to be mounted within an air chamber oriented perpendicularly to the longitudinal axis of the welding torch, the piston stem including opposed flat sides configured to be received within the elongated lock receiver slot to register the piston relative to the lock receiver, the welding torch assembly further comprising an air chamber cap enclosing an exterior opening of the air chamber, the piston head including at least one exterior annual groove and at least one seal positioned within the at least one annular groove, the at least one seal sealing the piston head within the air chamber.

2. The welding torch assembly of claim 1 wherein the piston is oriented such that the piston air channel is in fluid communication with an air passageway in the welding torch.

3. The welding torch assembly of claim 2 wherein pressurized air passes through the air passageway, aligned air channel, and into the internal cavity of the piston, causing the piston to move from the unlocked to the locked position.

4. The welding torch assembly of claim 3 wherein the piston includes a lower flange and a compression spring is disposed between the lower flange and the flat face of the lock receiver to bias the piston to the unlocked position.

5. The welding torch assembly of claim 4 wherein the piston stem terminates in a V-shaped groove.

6. A welding torch assembly comprising:
a welding torch defining a longitudinal axis and including a central bore extending along the longitudinal axis and an air chamber oriented perpendicularly to the longitudinal axis;
an electrode wire extending through the central bore;
a piston including a head and a piston stem, the head defining an internal cavity and including an air channel in fluid communication with the internal cavity, the piston reciprocally mounted within the air chamber; and
a cylindrical lock receiver having a flat face and including a central conduit, an elongated slot in communication with the central conduit, and a plurality of air holes extending longitudinally through the lock receiver, the electrode wire passing through the central conduit, and the lock receiver positioned within the central bore;
wherein the piston and the lock receiver are aligned such that the piston stem is received within the elongated slot, the piston is reciprocally movable between an unlocked position and a locked position, and the piston stem and the lock receiver are configured to clamp the electrode wire therebetween when the piston is in the locked position.

7. The welding torch assembly of claim 6 including an air chamber cap enclosing an exterior opening of the air chamber, the piston head including at least one exterior annual groove and at least one seal positioned within the at least one annular groove, sealing the piston head within the air chamber.

8. The welding torch assembly of claim 7 including an air passageway through the welding torch, the air passageway in fluid communication with the internal cavity of the piston.

9. The welding torch assembly of claim 8 wherein pressurized air passes through the air passageway, piston air channel, and into the internal cavity of the piston, causing the piston to move from the unlocked position to the locked position.

10. The welding torch assembly of claim 9 wherein the piston includes a lower flange, and a compression spring is disposed between the lower flange and the flat face of the lock receiver to bias the piston to the unlocked position.

11. The welding torch assembly of claim 9 wherein the piston stem includes opposed flat sides configured to be received within the elongated lock receiver slot to align the welding gun air passageway and the piston air channel.

12. The welding torch assembly of claim 6 wherein the plurality of air holes extending longitudinally through the lock receiver are configured to allow gas to flow through the central bore of the welding torch for supplying the welding operation.

13. The welding torch assembly of claim 6 including a fastener extending to the central bore, the lock receiver including a hole to secure the lock receiver within the central bore.

* * * * *